July 5, 1949.　　　R. A. GOEPFRICH ET AL　　　2,475,491
INTERNALLY EXPANDING BRAKE
Filed March 20, 1944　　　　　　　　　　　　6 Sheets-Sheet 1
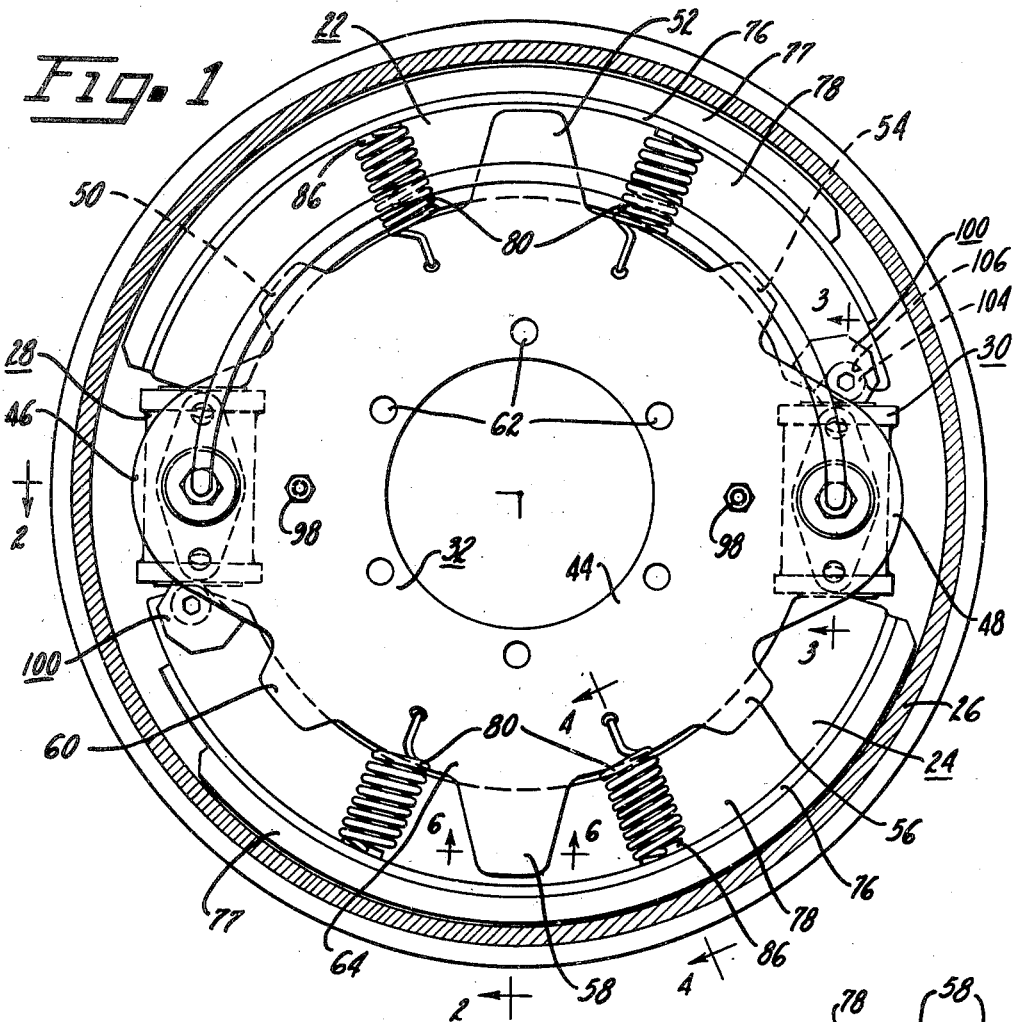
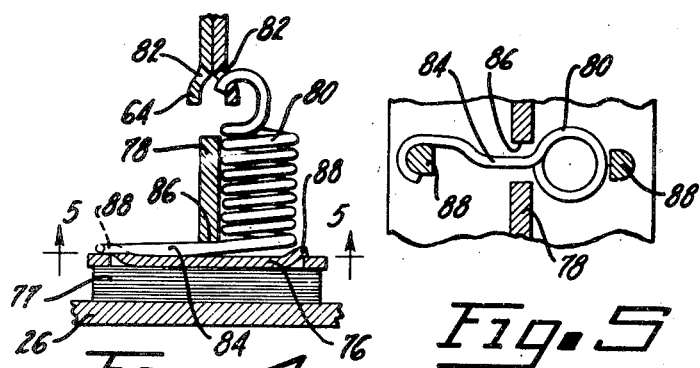
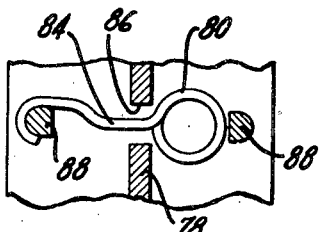
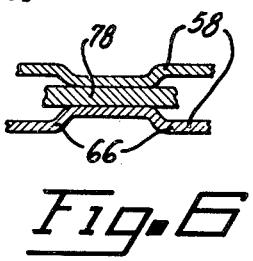
INVENTORS
BRYAN E. HOUSE
RUDOLPH A. GOEPFRICH
BY
T. J. Plante
ATTORNEY July 5, 1949.   R. A. GOEPFRICH ET AL   2,475,491
INTERNALLY EXPANDING BRAKE
Filed March 20, 1944   6 Sheets-Sheet 2

INVENTORS
BRYAN E. HOUSE
RUDOLPH A. GOEPFRICH
BY T. J. Plante
ATTORNEY

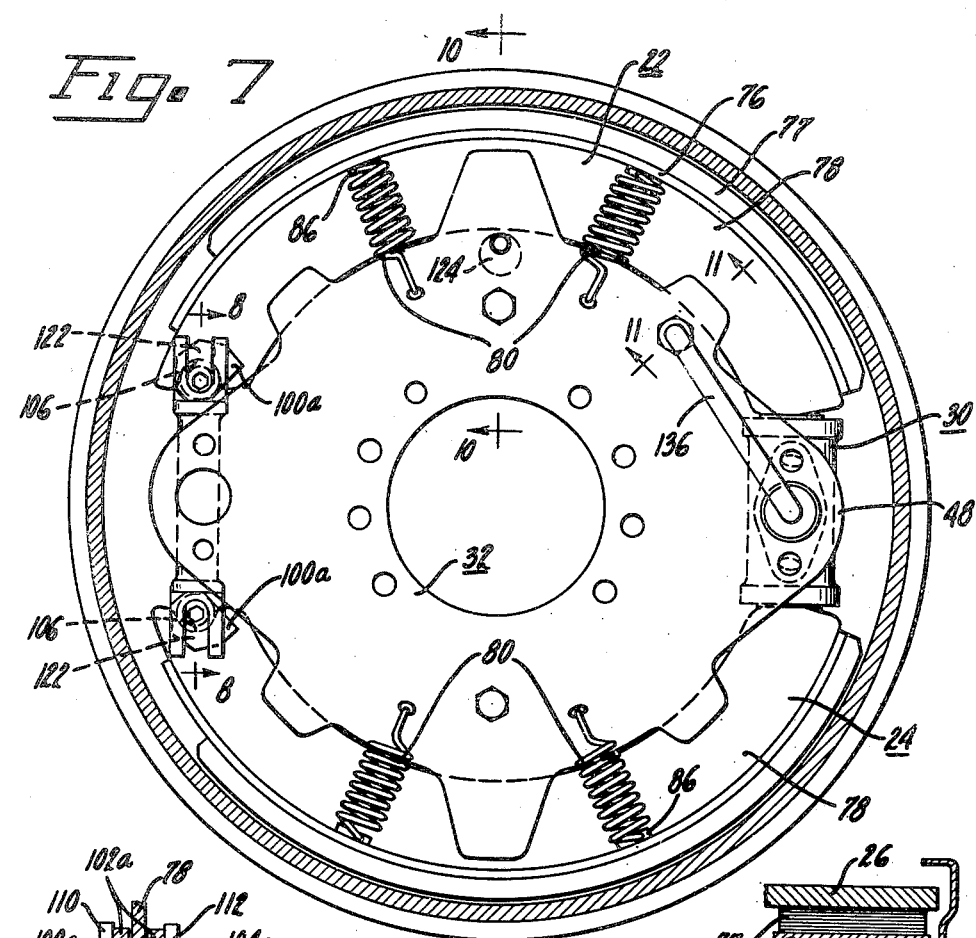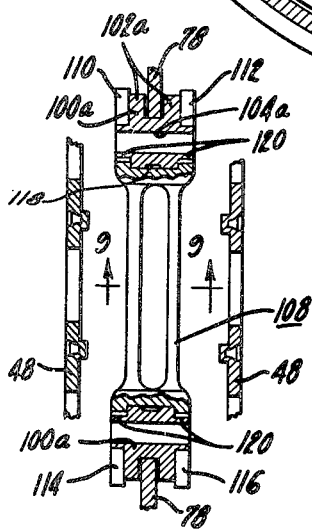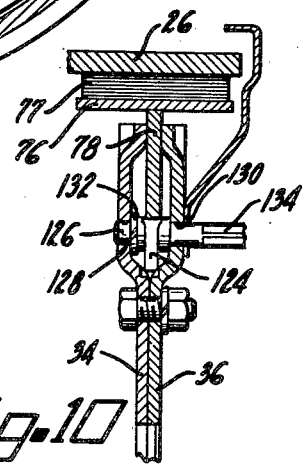

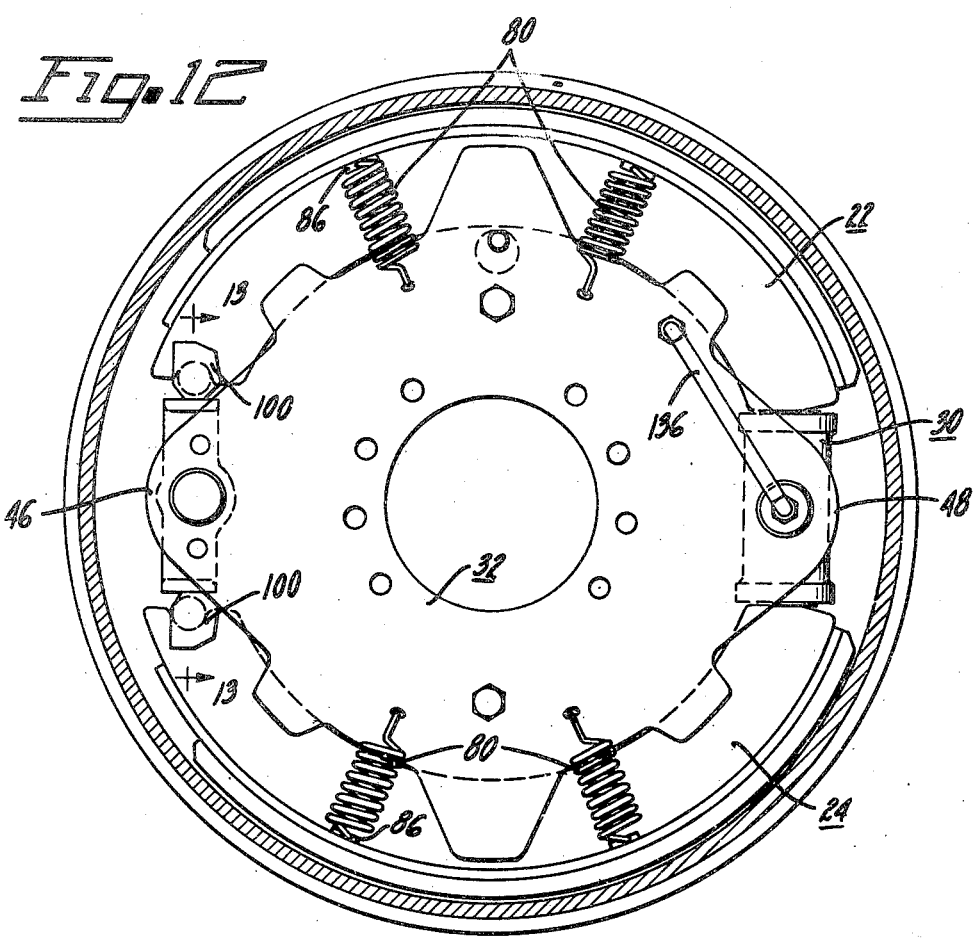
Fig. 12
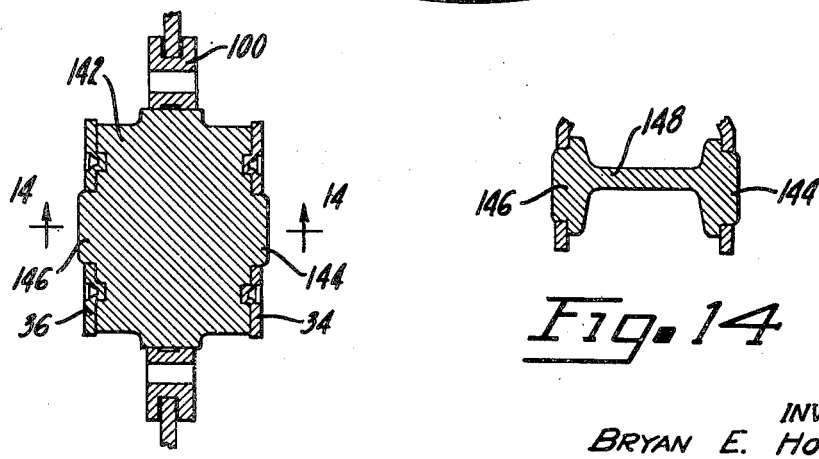
Fig. 13
Fig. 14
INVENTORS
BRYAN E. HOUSE
RUDOLPH A. GOEPFRICH
BY *T. J. Plante*
ATTORNEY

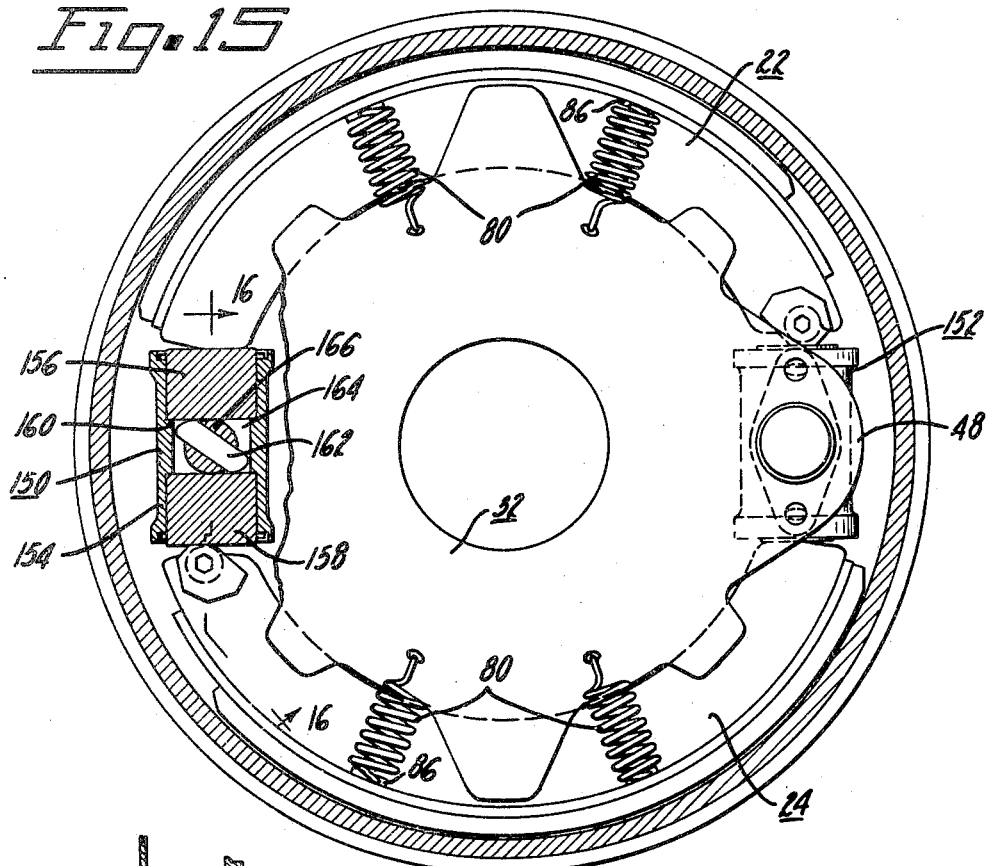
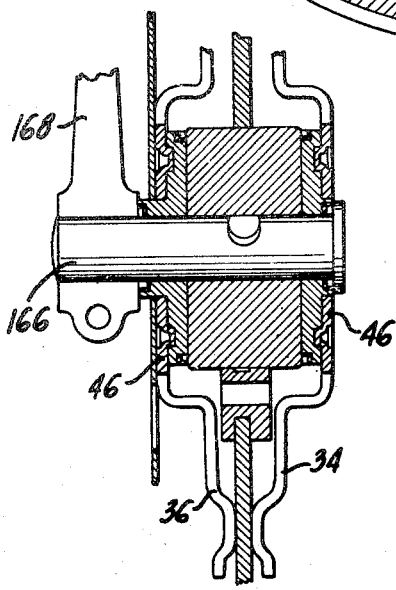

Patented July 5, 1949

2,475,491

UNITED STATES PATENT OFFICE 2,475,491

INTERNALLY EXPANDING BRAKE

Rudolph A. Goepfrich and Bryan E. House, South Bend, Ind., assignors to Bendix Aviation Corporation, South Bend, Ind., a corporation of Delaware Application March 20, 1944, Serial No. 527,271

32 Claims. (Cl. 188—78)

This invention relates to brakes, and more particularly to brakes of the drum type, having internal expanding shoes.

The shoes of most conventional drum brakes are mounted on and transmit their anchoring torque to backing plates by means of cantilever anchors. The anchoring load of the shoes is usually, if not always, capable of deflecting the anchors and distorting the backing plates, with several unfortunate results, such as possible wedging of the shoe ends between the anchors and the drum, permanent deformation of the backing plates, diminution of brake controllability, possibility of dragging brakes due to disturbed adjustment of the brakes, etc. Additionally, many backing plates are so formed that the torque taken by the radially outward portion of the plate has an appreciable moment tending to twist the torque-taking part of the plate with respect to the center portion thereof, which is secured to a fixed member, such as an axle housing. This twisting moment is due to the axial spacing of the torque-taking part of the backing plate from the central mounting portion thereof.

An object of the present invention is to provide an improved brake structure, wherein anchor deflection and backing plate distortion are substantially eliminated.

A further object of the present invention is to provide an improved brake structure which has the advantages stated in the preceding paragraph and which, regardless of the added structural requirements, can be manufactured inexpensively and with a minimum of complicated operations.

A still further object of the present invention is to provide improved support or torque-reaction means for receiving the anchoring torque of the brake shoes.

A still further object of the present invention is to provide a brake structure wherein the shoes are disposed radially outwardly of the supporting or torque-reaction member, but which structure, nevertheless, can be satisfactorily accommodated within the limited space available for the brake assembly.

A still further object of the present invention is to provide a plurality of brakes having different dispositions of the shoes with consequent differences in operating characteristics due to variations in the amount of shoe self-energization and servo-action, but having, nevertheless, a large number of interchangeable parts, one advantage being to cut the number of tools required to produce a plurality of different types of brakes, and thereby reduce overall manufacturing cost.

Other objects and advantages of the present invention will become apparent during the course of the following description, reference being had therein to the accompanying drawings, wherein:

Fig. 1 is a side elevation of a brake assembly incorporating certain principles of our invention;

Figs. 2 to 4, inclusive, are enlarged sections taken on the lines 2—2, 3—3, and 4—4, respectively, of Fig. 1;

Fig. 5 is a section taken on the line 5—5 of Fig. 4;

Fig. 6 is an enlarged section taken on the line 6—6 of Fig. 1;

Fig. 7 is a side elevation of a brake assembly showing a second embodiment of our invention, and also illustrating a brake having different operating characteristics from the brake of Figs. 1 to 6, but having the maximum number of common parts;

Fig. 8 is an enlarged section taken on the line 8—8 of Fig. 7;

Fig. 9 is a section taken on the line 9—9 of Fig. 8;

Figure 11:
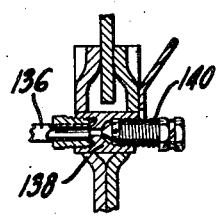

Figs. 10 and 11 are enlarged sections taken on the lines 10—10 and 11—11, respectively, of Fig. 7;

Fig. 12 is a side elevation of a brake assembly showing a third embodiment of our invention, and also illustrating a brake having different operating characteristics from the brakes of Figs. 1 to 6 and of Fig. 7 to 11, but having the maximum number of parts which can be used also in one or both of the preceding brake types;

Fig. 13 is an enlarged section taken on the line 13—13 of Fig. 12;

Fig. 14 is a section taken on the line 14—14 of Fig. 13;

Fig. 15 is a side elevation of a brake assembly showing a fourth embodiment of our invention, and also having the maximum number of parts identical with similar parts in the preceding embodiments;

Fig. 16 is an enlarged section taken on the line 16—16 of Fig. 15; and

Figure 17:
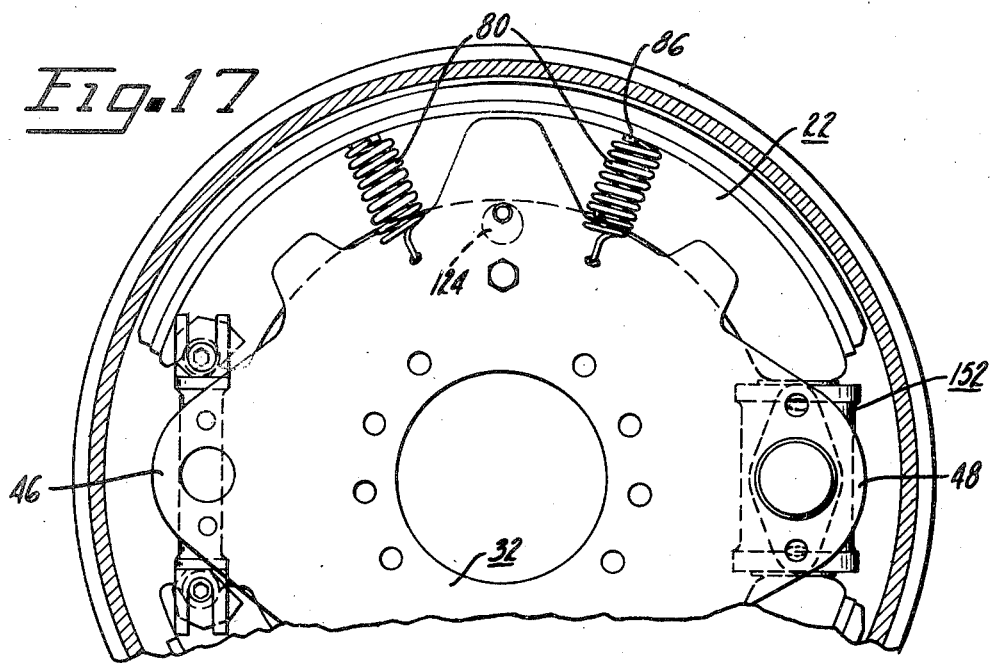
Figure 18:
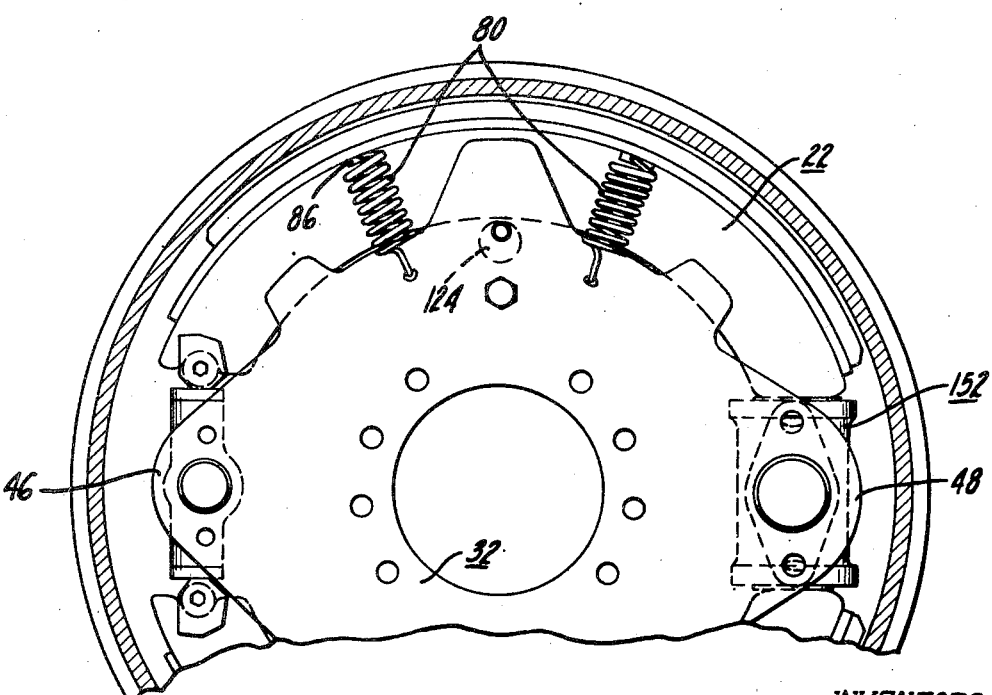

Figs. 17 and 18 are side elevations of brake assemblies showing fifth and sixth embodiments, respectively, of our invention, said assemblies also incorporating many parts common to the several embodiments.

The brake of Figs. 1 to 6, inclusive, comprises two shoes 22 and 24 which are individually shiftable to anchor at either end depending upon the direction of rotation of the drum 26 at the time of contact. Both shoes are self-energizing in both directions (forward and rearward) of drum rotation. In the illustrated brake the anchoring torque or load of the shoes is transmitted through the hydraulic cylinders 28 and 30 to a support or torque-reaction member indicated generally at 32.

In order that the anchoring torque or load of the shoes will exert an axially centred balanced force on the support or torque-reaction member 32, and in order that the anchoring torque of the shoes will not tend to deflect the anchors (in this case the cylinders), the cylinders are "straddle-mounted" on the support member, i. e., they are supported at both sides by axially spaced extensions or arms of the support member, 'axially" in the instant usage referring to the axis of the brake assembly as a whole, and of the drum and wheel with which the brake is associated. The longitudinal axes of the cylinders are preferably located midway between the supporting arms of the torque-reaction member, in order that the anchoring load will be divided equally between said arms.

We prefer that the support member 32, which may also be referred to as a "spider," comprise two plate-like members 34 and 36 (see particularly Fig. 2) which have central mounting portions lying flat against one another and adapted to be secured by a plurality of rivets 38, or bolts or the like, to a fixed or non-rotating member 40, such as the steering knuckle or axle housing of an automotive vehicle. The fixed member 40 is preferably provided with a flange 42 which allows considerable bearing surface for the spider plates which are clamped against it.

The plates 34 and 36, which are preferably symmetrical and identical in order to allow manufacture of both plates by the same dies, are of such conformation that they may be made by a stamping (or punching) process. Although they might also be formed by casting or forging, the stamping method will usually be the most economical, and generally the most satisfactory, except when the number of parts to be manufactured is too small to warrant the preparation of dies, in which case casting may be more economical. However, the plates 34 and 36 are primarily designed and intended to be formed by stamping.

The manufacture of the plates or stampings will usually require three dies, the first die a blanking die, by means of which the unformed plate would be cut from a strip or sheet. A second die would pierce all the holes, while a third die would form the plate to the necessary contours.

Figure 2:
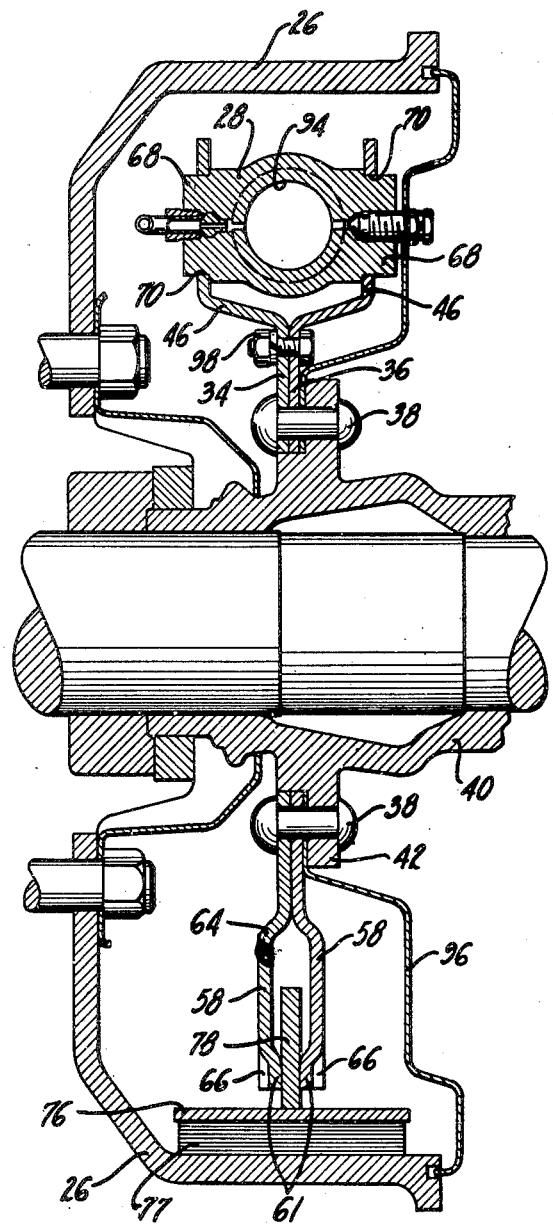

Each of the stampings has a plurality of circumferentially spaced substantially radially extending arms offset axially from the central mounting portion 44. In the type of brake shown in Fig. 1, two of these arms 46 and 48 are torque-taking arms, and the remaining arms are availed of to guide the shoe webs. In the illustrated brake assembly the shoe guiding arms provided by each stamping are six in number, indicated at 50, 52, 54, 56, 58 and 60. As shown, the center guiding arms 52 and 58 may be relatively long to extend close to the respective shoe rims and thereby give the optimum guiding effect, while the arms 50, 54, 56 and 60 may be relatively short as shown in order to bring the contact points between the shoes and arms close to the ends of the shoes. Preferably the long center guiding arms contact the shoe webs only at or near the ends of the arms, as shown in Fig. 2, thus insuring that the effective contact points 61 will be as far outward radially as possible. The number of shoe guiding arms may be less than six, but use of three guides for each shoe has certain advantages, as will presently be explained.

The flat central mounting portions 44 of the stampings are provided with a plurality of holes 62 to accommodate the securing members 38. The central mounting portions of the stampings will usually be annular or disc-shaped in order to leave open the center of the brake to accommodate mechanisms such as the axles of vehicles. The stampings are each preferably formed with an annular flared strengthening flange 64 (see particularly Fig. 4), which provides additional support between adjacent arms. To further strengthen the shoe guiding arms, they may be formed with side flanges 66, as illustrated in Fig. 6.

Figure 3:
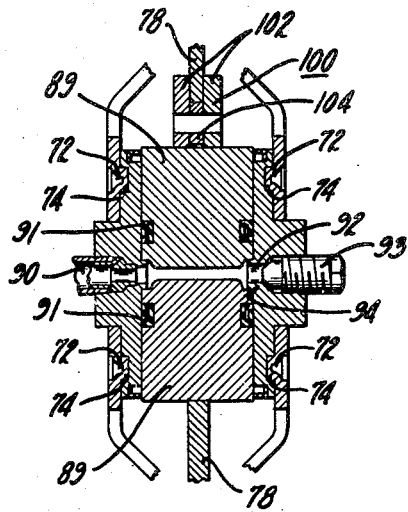

The several arms of the two plates or stampings 34 and 36 are preferably arranged in aligned pairs, as illustrated (see, for example Figs. 2, 3 and 6). Although alignment is not necessary in all cases, it is both desirable and uncomplicated, since the plates are preferably symmetrical and identical as indicated above.

In the type of brake shown in Figs. 1 to 6, two pairs of arms 46 and 48, which are preferably located diametrically opposite one another, serve as torque-taking arms. As seen in Fig. 2, which shows the paired arms 46 at one side of the brake assembly, the flare of the arms 46 must be sufficient to embrace the respective hydraulic cylinder 28, the axis of the cylinder bore being substantially tangential to the brake assembly and lying in the center plane of the double-plate supporting spider 32.

In order to mount the cylinders 28 and 30 on the respective pair of torque-taking arms, the cylinders are each preferably provided with two oppositely disposed laterally extending bosses 68 extending through apertures 70 in the arms of the stampings. To simplify the manufacture of the cylinders, particularly with respect to the machining step, the bosses 68 and therefore the apertures 70, are preferably cylindrical. Since the bosses are co-axial, it is necessary to provide additional locating means for the cylinders to prevent turning of the cylinders about the co-axis of the laterally-extending bosses. We prefer to use a plurality of locating nibs or projections 72, formed on the spider, and extending into depressions 74 in the cylinders (see Fig. 3). In order that the nibs 72 extending into depressions 74 may prevent turning of the cylinders about the axis of the bosses 68 while allowing for manufacturing tolerances in aligning the nibs with the depressions, the nibs may be oval-shaped as shown in Figs. 1 and 3.

The shoes 22 and 24, which are conventional in design, are arcuate to conform to the drum curvature, and are of T cross-section, each shoe having a rim 76 parallel to the braking surface of the drum and lined with a friction material 77, and a web 78 normal to the rim. The webs of the shoes are arranged to lie in the center plane of the double-plate supporting spider 32, the same plane as the longitudinal axes of the cylinders 28 and 30. Because of the foregoing and additionally because the cylinder axes are midway between the paired arms of the plates, the anchoring of each shoe exerts an axially centered balanced force on the supporting spider. There is no tendency to anchor deflection, or to shoe misalignment. The load is equally divided between the two axially spaced arms of the spider, and the possibility of spider distortion is minimized. Additionally, because the shoe webs lie in the center plane of the spider, the anchoring torque is applied centrally of the disc mounting portions 44 of the plates, and there is no load on the spider which is axially offset from that portion of the spider which is secured to a fixed part of the vehicle.

The remaining pairs of spider arms are utilized in guiding and laterally supporting the shoes, as briefly mentioned above. Each pair of arms 50, 52, 54, 56, 58 and 60 embraces the web 78 of one of the shoes, as shown in Figs. 2 and 6, three pair of arms being used as guides for each shoe. Use of fewer than three guides for each shoe is not entirely satisfactory. This is true because three points are required to stabilize the shoe. With less than three guides, any tendency of the shoe to cock, i. e., to incline its web with respect to the vertical plane in which it normally lies, would not be sufficiently resisted. Where two guides per shoe are used, it is possible for the shoes to rock unless the guide arms are in close contact with the shoe web for a considerable length. Obviously, the number of guides for the shoes may be reduced without substantially changing the operating principles of the brake, but the disadvantages outlined above will usually result. It might be possible to use a single continuous retaining flange for the shoes, but this would raise a problem as to mounting the shoe return springs, as will hereinafter be explained.

We have provided a novel arrangement of the shoe return springs. These springs, which retain the shoes in released position except at the time of brake application, are particularly adapted for use with our improved brake structure. Referring to Figs. 1, 4 and 5, a plurality of tension return springs 80 are connected between the respective shoes and the spider. We prefer that the center line, or line of force, of the springs extend substantially radially of the brake assembly. The inner end of each spring is hooked to the flange 64 of one of the plates, an opening 82 in the flange being provided for this purpose. The presence of the flange 64 is particularly convenient, because it makes it unnecessarily to have a long extension on the hooked end of the spring. It will be noted that an unused hole 82 is also provided in the opposite plate. Ordinarily it will probably be desirable to put the holes in the plates regardless of necessity. This is particularly true where all the holes in each plate are pierced in one die. Even if the spring holes were pierced in a separate operation, it might not be to advantage to pierce just half the plates, since this would require matching the plates during assembly.

In order to allow as many spring coils as possible within the limited radial space available, we prefer to extend an arm 84 of the outer coil through an opening 86 in the web of the shoe, and to hook the end of the arm 84 on a projection 88 formed on the inside of the shoe rim. The projections 88 are preferably formed in both sides of the shoe rims to avoid having separate right and left-hand shoes.

The force of the spring on the shoe is exerted through the contact between the arm 84 and the edge of the opening 86. Because the line of force of the spring is offset from the center of the shoe, the spring exerts a slight cocking force on the shoe which helps to eliminate shoe rattle. This cocking is not sufficient to cause serious misalignment of the shoes. Actually, it simply holds them against one side of the shoe guides.

In addition to the above, the illustrated springs have other advantages. They permit one shoe to be removed from the brake assembly without disturbing the other, also, they leave the center of the brake assembly relatively free and unobstructed.

Each of the cylinders 28 and 30 has two pistons 89 reciprocable therein (see Fig. 3). These pistons, which are provided with the customary seals 91, are adapted to be spread by liquid under pressure admitted to the center of the cylinder through an inlet port 90, the pistons exerting a tangential force on the webs 78 of the respective shoes. In the illustrated brake assembly the longitudinal axes of the cylinders are vertical. This has the advantage that the shoes are positively located vertically, one resting on the upper end of the cylinders, and the other being held against the lower end of the cylinders by the return springs 80. With this arrangement, the weight of the shoes cannot affect their concentricity with the brake drum.

Where vertical cylinders are used in a brake assembly proper bleeding of the cylinders is best accomplished if the space between the pistons is extremely small, and if very little or none of this space extends above the bleed openings 92, as in the instant illustration. This bleed opening, which is provided with bleeder screw 93, is then high enough to permit escape of sufficient air from the cylinder during bleeding.

Where the pistons substantially fill the cylinder in released position, as in the instant case, it is convenient and inexpensive to transmit the anchoring torque of the shoes to the cylinders through the intermediary of the pistons. For this purpose we retain, in each cylinder a centrally located inwardly extending annular anchor flange 94.

A cover plate 96 may be utilized to prevent foreign matter from entering the inside of the brake drum and lodging in the brake assembly. The bolts 98 which clamp the plates together are used for shipping purposes only. They may be returned to the manufacture of the brake assembly after the brake has been fixed on the vehicle, in order to save material expense.

Means 100 are provided for adjusting each of the shoes to compensate for wear, said means being adapted to increase the distance between the shoe anchor and the end of the shoe in released position. The adjusting means for each shoe may comprise a pair of identical irregular polygon-outlined plates 102 straddling the shoe web and connected by a shaft 104 normal to and pivoted on the shoe web 78, said shaft being journaled in a socket 106 provided in the end of the shoe, and the periphery of the polygon plates being in contact with the anchor (in this case the piston). The structure of these adjustors is more fully explained in our U. S. patent application Serial No. 502,858, filed September 18, 1943, patented June 24, 1947, Number 2,423,015.

The brake shown in Figs. 7 to 11, inclusive, is of the type wherein two shoes are pivotally connected or articulated at one end, and are applied and anchored at their adjacent disconnected ends, one shoe anchoring in one direction of drum rotation and being applied by the other, and the relationship being reversed in the opposite direction of drum rotation.

The shoes 22 and 24, which are preferably of the same construction as the shoes of Fig. 1, are applied by, and anchor on the hydraulic cylinder 30 which also is preferably identical with the cylinders of Fig. 1. In this case, however, only one hydraulic cylinder is necessary. The cylinder 30 of Fig. 7 is mounted between and supported by a pair of torque-taking arms 48, formed on the spider 32, the arrangement again being the same as that of Fig. 1.

The two stampings or plates 34 and 36 of Figs. 7 to 11 are preferably substantially identical in construction with the plates 34 and 36 of Fig. 1. This means that, for a given diameter brake assembly and drum, the plates may be formed in the same dies and be interchangeable regardless of the type of brake which is to be built. This, obviously, makes manufacture of the brakes less expensive, since a single tooling suffices for the stamped plates of all types of brake of a given size. Furthermore, as mentioned above, the cylinder 30 and the shoes 22 and 24, as well as the plates 34 and 36, are all interchangeable. Additionally, the same springs 80 are used in the different types of brake.

In the brake of Figs. 7 to 11, the shoes 22 and 24 are interconnected, at the end opposite the cylinder 30, by means of a floating link or strut 108. This link, which is shown particularly in Figs. 8 and 9, may conveniently be formed as a forging. Because of the inherent strength of forged parts, it is possible to lessen the weight of the link 108 by reducing the thickness of the center section 109 of the link, as shown in Fig. 9.

The link 108 is bifurcated at both ends to straddle the ends of the webs 78 of the shoes, the furcations 110 and 112 straddling the web of shoe 22, and the furcations 114 and 116 straddling the web of shoe 24. Two polygon adjustors 100a are adapted to vary the distance between the link-connected ends of the shoes. Each of these adjustors has a center shaft portion 104a journaled in a socket or groove 106 in one end of each of the shoes, and a pair of identical polygon plates 102a connected by the shaft and in peripheral contact with the flat surface 118 provided at each end of the link 108. The two polygon plates of each adjustor straddle the web of the respective shoe and are in turn straddled by the forked ends of the link 108.

The polygon adjustors of Figs. 7 to 11 differ from those of Fig. 1 in having side shanks 120 which guide the two adjustors in the bifurcated ends of link 108, and which also serve to support the link. Each fork formed by bifurcation of each end of the link is itself bifurcated, thus providing a slot 122 which permits relative movement of the link and the adjustor shanks as the position of the shoes is adjusted. It is desirable to have an initial clearance between the inner edge of the shank and the inner edge of the slot in order that the surface of contact between the link and the adjustor will be on the flat face of the polygon and not on the shaft.

Although the polygon adjustors 100a of Fig. 7 differ from the polygon adjustors 100 of Fig. 1 in having the shanks referred to above, it would be possible to use the adjustors 100a of Fig. 7 in the brake assembly of Fig. 1, if uniformity is desired.

Since there is no anchor at the left side of the brake assembly shown in Fig. 7, it is necessary to provide added supporting means for the shoes. As shown in Figs. 7 and 10, we utilize an adjustable support constituted by an eccentric cam 124 in contact with the web of shoe 22 and rotatable with a shaft 126 journaled in openings 128 and 130 in the respective plates forming the spider. A lockwasher friction device 132 may be used to hold the eccentric in adjusted position. One end of shaft 126 has a head 134 which is provided with flats to accommodate an adjusting wrench.

Owing to the fact that the brake of Fig. 7 has only one hydraulic cylinder, if this cylinder is identical with the cylinders of Fig. 1, it will have only one hydraulic inlet outside the brake assembly, i. e., in an easily accessible position when the hydraulic system is to be serviced. Since two hydraulic connections are required outside the brake assembly, one to conduct fluid to the cylinder, and the other for bleeding, we have provided the bleeding connection illustrated in Fig. 11. A short tube 136 (see Fig. 7) leads from the inner port of cylinder 30 to a hollow plug 138 supported in the plates of the spider. A bleed closure 140, which is accessible from outside the brake assembly, is screwed into the hollow plug 138. When it is desired to bleed the hydraulic system, the closure 140 is removed, and the liquid is forced through the system and out the opening provided by the removal of said closure.

The eccentric shoe support shown in Fig. 10 and the bleeder arrangement shown in Fig. 11 require extra holes in the spider plates 34 and 36. These holes may also be made in the spider plates of Fig. 1 if it is desired to obtain absolute uniformity in the plates, whether to reduce production costs, or for other reasons.

Figs. 12 to 14, inclusive, illustrate a brake assembly of the "non-servo" type which incorporates our invention. By "non-servo" is meant a brake wherein the shoes are permanently pivoted at one side of the drum and are applied by spreading their free ends.

The assembly shown in Fig. 12 preferably uses the same support plates 34 and 36 as the assemblies of Figs. 1 and 7, thus providing for uniformity in manufacture of the various types of brakes, when the same diameter drum is intended. Additionally, the hydraulic applying cylinder 30, the springs 80, and the shoes 22 and 24 may be the same as those of Figs. 1 and 7.

In place of the cylinder 28 of Fig. 1 and the link 108 of Fig. 7, the left side of the brake of Figs. 12 to 14 is provided with an anchor member 142 which has lateral bosses 144 and 146 supported in the apertures of the torque-taking pair of arms 46 of the support plates 34 and 36, the anchor member being supported on the pair of arms 46 in the same manner that the cylinder 30 is supported on the torque-taking pair of arms 48.

The anchor member 142 is preferably a forged part, and may therefore be reduced in section, as shown in Fig. 14, in order to save weight, the reduced center of the forging being indicated by the numeral 148.

Polygon adjustors 100, which may be identical with those of either of the preceding brake assemblies, are preferably pivoted on the left ends of the shoes and in peripheral contact with the upper and lower ends of the anchor member 142.

The single hydraulic cylinder of Fig. 12 may have the same bleeder arrangement as the cylinder of Fig. 7, as shown.

The brake of Figs. 15 and 16 is preferably identical with that of Fig. 1, except that mechanical applying means, indicated generally at 150 and 152, replace the hydraulic cylinders 28 and 30.

As in the case of the hydraulic cylinders, the mechanical applying mechanism may be so designed that its housing receives the anchoring torque of the shoes. Thus, each mechanical applying device may have a cylindrical housing 154 supported on the respective pair of torque-taking arms of the support plates 34 and 36. Within each housing 154, two pistons 156 and 158 may be arranged to anchor against an inwardly extending central flange 160 of the housing. The applying mechanism at each side of the brake may comprise a floating cam 162 bearing at each end against one of the pistons, and slidable in a cross bore 164 formed in a shaft 166. If an arm 168 is splined to each shaft 166, and the arms are interconnected for simultaneous actuation, the shafts at opposite sides of the brake will turn at the same time. Depending on the direction of drum rotation, one piston in each housing will anchor, and the cam 162 will move the unanchored piston outwardly to force the toe of the respective shoe into the drum.

The mounting bosses and locating nibs for the housings 154 of the mechanical applying units 150 and 152 may be the same as those of the hydraulic cylinders 28 and 30, thus permitting use of identical spiders. It is even possible to machine the housings 154 from the same rough castings as the hydraulic cylinders.

The brake assembly of Fig. 17 is intended to be identical with that of Fig. 7, except that a mechanical actuator 152, corresponding to the mechanical actuators of Fig. 15, replaces the hydraulic cylinder 30 of Fig. 7.

The brake assembly of Fig. 18 is intended to be identical with that of Fig. 12, except that a mechanical actuator 152, corresponding to the mechanical actuators of Fig. 15, replaces the hydraulic cylinder 30 of Fig. 12.

From the foregoing description of the several embodiments of our invention, it is apparent that several important advantages are provided by our improved brake structure. Offset load on the shoe anchors, and on the support member has been entirely eliminated resulting in a more efficient, dependable, and longer-lasting brake. At the same time, these important operating advantages have been obtained by a structure which can be inexpensively manufactured, due to simplification of the process of manufacture, reduction of the number of component parts or pieces, elimination of shoe hold down devices and the like, and provision of like parts wherever possible. Our improved brake is much easier to service than brakes heretofore provided, because it can conveniently and rapidly be assembled and disassembled. Furthermore, each shoe may be individually removed from the assembly. The adjusting procedure is simple.

Because of the double-plate construction of the supporting spider, it is possible to form the component parts of the spider by a simple stamping process. Furthermore, owing to the centralization of anchoring load, the same parts are usable with any width shoe.

Although particular embodiments of our invention have been described, it will be understood by those skilled in the art that the object of the invention may be attained by the use of constructions different in certain respects from that disclosed without departing from the underlying principles of the invention. We therefore desire by the following claims to include within the scope of our invention all such variations and modifications by which substantially the results of our invention may be obtained through the use of substantially the same or equivalent means.

We claim:

1. A drum brake comprising a supporting spider composed of two symmetrical plate-like stampings having central disc portions lying flat against one another and against an annular flange on a fixed member to which they are secured, each of said stampings having an annular flared strengthening flange and also having eight circumferentially spaced substantially radially extending arms offset axially from said central portion, the arms of the two stampings being arranged in pairs of axially spaced aligned arms, two of said pairs of arms serving as torque-taking arms, said torque-taking arms being located diametrically opposite one another and being provided with centrally located cylindrical apertures, a pair of hydraulic cylinders each having cylindrical bosses extending laterally for support into the apertures of one of said diametrically opposed pairs of arms, nibs on said apertured arms of the spider projecting into complementary depressions in the exterior of the cylinders to prevent said cylinders from rotating about the axes of the laterally extending bosses, the longitudinal axes of the cylinders lying in the center plane of the spider, each of said cylinders having a pair of pistons reciprocable therein adapted to spread the adjacent ends of the shoes under the influence of fluid pressure, a pair of arcuate T-section shoes having their webs lying in the center plane of the spider and guided between the six remaining pairs of circumferentially spaced spider arms, each of said shoes being guided by three said pairs of arms located near each end of the shoe and approximately at the center thereof, each of said shoes anchoring at one end or the other on one or the other of the two hydraulic cylinders depending upon the direction of drum rotation, and each of said shoes when anchored exerting an axially centered balanced force on one pair of torque-taking spider arms, individual means for adjusting each of said shoes to compensate for wear adapted to increase the distance between the shoe anchor and one end of the shoe in released position, said means comprising identical plates straddling the shoe web and connected by a shaft normal to and pivoted on said web, and means for normally retaining both ends of the shoes in contact with the anchors and for returning the shoes to released position after application comprising at least four radially extending tension springs, two acting on each shoe, connected at their inner ends to the annular strengthening flange of one of the plate-like stampings and at their outer ends by means of arms extending through openings in the shoe webs to projections formed on the under side of the shoe rims, the force of the springs on the shoes being exerted by the spring arms acting on the inner edge of said web openings, the springs due to the spacing of their axes from the plane of the shoe webs exerting a slight cocking force on the shoes to prevent rattling thereof.

2. A drum brake comprising a supporting spider composed of two symmetrical plate-like stampings having central disc portions lying flat against one another and against an annular flange on a fixed member to which they are secured, each of said stampings having an annular flared strengthening flange and also having eight circumferentially spaced substantially radially extending arms offset axially from said central portion, the arms of the two stampings being arranged in pairs of axially spaced aligned arms, at least one of said pairs of arms serving as torque-taking arms, said torque-taking arms being provided with centrally located cylindrical apertures, an actuating cylinder having cylindrical bosses extending laterally for support into the apertures of said torque-taking pair of arms, nibs on said apertured arms of the spider projecting into complementary despressions in the exterior of the cylinder to prevent said cylinder from rotating about the axis of the laterally extending bosses, the longitudinal axis of the cylinder lying in the center plane of the spider, said cylinder having a pair of pistons reciprocable therein adapted to spread the adjacent ends of the shoes, a pair of arcuate T-section shoes having their webs lying in the center plane of the spider and guided between the six remaining pairs of circumferentially spaced spider arms, each of said shoes being guided by three said pairs of arms located near each end of the shoe and approximately at the center thereof, means for adjusting the position of said shoes to compensate for wear, means for nomally retaining the shoes in released position comprising at least four radially extending tension springs, two acting on each shoe, connected at their inner ends to the annular strengthening flange of one of the plate-like stampings and at their outer ends by means of arms extending through openings in the shoe webs to projections formed on the under side of the shoe rims, the force of the springs on the shoes being exerted by the spring arms acting on the inner edge of said web openings, the springs due to the spacing of their axes from the plane of the shoe webs exerting a slight cocking force on the shoes to prevent rattling thereof.

3. A drum brake comprising a supporting spider composed of two symmetrical plate-like stampings having central disc portions lying flat against one another and against an annular flange on a fixed member to which they are secured, each of said stampings having an annular flared strengthening flange and also having at least seven circumferentially spaced substantially radially extending arms offset axially from said central portion, the arms of the two stampings being arranged in pairs of axially spaced aligned arms, at least one of said pairs of arms serving as torque-taking arms, said torque-taking arms being provided with centrally located cylindrical apertures, a combined anchor and actuator having cylindrical bosses extending laterally for support into the apertures of said torque-taking pair of arms, nibs on said apertured arms of the spider projecting into complementary depressions in the exterior of the actuator to prevent said actuator from rotating about the axis of the laterally extending bosses, the longitudinal axis of the actuator lying in the center plane of the spider, a pair of arcuate T-section shoes having their webs lying in the center plane of the spider and guided between the six remaining pairs of circumferentially spaced spider arms, each of said shoes being guided by three said pairs of arms located near each end of the shoe and approximately at the center thereof, and each of said shoes when anchored exerting an axially centered balanced force on the pair of torque-taking spider arms, means for adjusting the position of said shoes to compensate for wear, and means for normally retaining the shoes in released position comprising at least four radially extending tension springs, two acting on each shoe, connected at their inner ends to the annular strengthening flange of one of the plate-like stampings and at their outer ends by means of arms extending through openings in the shoe webs to projections formed on the under side of the shoe rims, the force of the springs on the shoes being exerted by the spring arms acting on the inner edge of said web openings, the springs due to the spacing of their axes from the plane of the shoe webs exerting a slight cocking force on the shoes to prevent rattling thereof.

4. A drum brake comprising a supporting spider composed of two symmetrical plate-like stampings having central disc portions lying flat against one another and against an annular flange on a fixed member to which they are secured, each of said stampings having an annular flared strengthening flange and also having at least seven circumferentially spaced substantially radially extending arms offset axially from said central portion, the arms of the two stampings being arranged in pairs of axially spaced aligned arms, at least one of said pairs of arms serving as torque-taking arms, said torque-taking arms being provided with centrally located cylindrical apertures, an anchor member having cylindrical bosses extending laterally for support into the apertures of said torque-taking pair of arms, nibs on said apertured arms of the spider projecting into complementary depressions in the exterior of the anchor member to prevent said anchor member from rotating about the axis of the laterally extending bosses, the longitudinal axis of the anchor member lying in the center plane of the spider, a pair of arcuate T-section shoes having their webs lying in the center plane of the spider and guided between the six remaining pairs of circumferentially spaced spider arms, each of said shoes being guided by three said pairs of arms located near each end of the shoe and approximately at the center thereof, and each of said shoes when anchored exerting an axially centered balanced force on the pair of torque-taking spider arms, means for adjusting the position of said shoes to compensate for wear, and means for normally retaining the shoes in released position comprising at least four radially extending tension springs, two acting on each shoe, connected at their inner ends to the annular strengthening flange of one of the plate-like stampings and at their outer ends by means of arms extending through openings in the shoe webs to projections formed on the under side of the shoe rims, the force of the springs on the shoes being exerted by the spring arms acting on the inner edge of said web openings, the springs due to the spacing of their axes from the plane of the shoe webs exerting a slight cocking force on the shoes to prevent rattling thereof.

5. A drum brake comprising a supporting spider composed of two symmetrical plate-like stampings having central disc portions lying flat against one another and against an annular flange on a fixed member to which they are secured, each of said stampings having an annular flared strengthening flange and also having eight circumferentially spaced substantially radially extending arms offset axially from said central portion, the arms of the two stampings being arranged in pairs of axially spaced aligned arms, two of said pairs of arms serving as torque-taking arms, said torque-taking arms being located diametrically opposite one another and being provided with centrally located cylindrical apertures, a pair of hydraulic cylinders each having cylindrical bosses extending laterally for support into the apertures of one of said diametrically opposed pairs of arms, nibs on said apertured arms of the spider projecting into complementary depressions in the exterior of the cylinders to prevent said cylinders from rotating about the axes of the laterally extending bosses, the longitudinal axes of the cylinders lying in the center plane of the spider, each of said cylinders having a pair of pistons reciprocable therein adapted to spread the adjacent ends of the shoes under the influence of fluid pressure, a pair of arcuate T-section shoes having their webs lying in the center plane of the spider and guided between the six remaining pairs of circumferentially spaced spider arms, each of said shoes being guided by three said pairs of arms located near each end of the shoe and approximately at the center thereof, each of said shoes anchoring at one end or the other on one or the other of the two hydraulic cylinders depending upon the direction of drum rotation, and each of said shoes when anchored exerting an axially centered balanced force on one pair of torque-taking spider arms, and means for normally retaining both ends of the shoes in contact with the anchors and for returning the shoes to released position after application comprising at least four radially extending tension springs, two acting on each shoe, connected at their inner ends to the annular strengthening flange of one of the plate-like stampings and at their outer ends by means of arms extending through openings in the shoe webs to projections formed on the under side of the shoe rims, the force of the springs on the shoes being exerted by the spring arms acting on the inner edge of said web openings, the springs due to the spacing of their axes from the plane of the shoe webs exerting a slight cocking force on the shoes to prevent rattling thereof.

6. A drum brake comprising a supporting spider composed of two symmetrical plate-like stampings having central disc portions lying flat against one another and against an annular flange on a fixed member to which they are secured, each of said stampings having an annular flared strengthening flange and also having eight circumferentially spaced substantially radially extending arms offset axially from said central portion, the arms of the two stampings being arranged in pairs of axially spaced aligned arms, two of said pairs of arms serving as torque-taking arms, said torque-taking arms being located diametrically opposite one another and being provided with centrally located cylindrical apertures, a pair of hydraulic cylinders each having cylindrical bosses extending laterally for support into the apertures of one of said diametrically opposed pairs of arms, nibs on said apertured arms of the spider projecting into complementary depressions in the exterior of the cylinders to prevent said cylinders from rotating about the axes of the laterally extending bosses, the longitudinal axes of the cylinders lying in the center plane of the spider, each of said cylinders having a pair of pistons reciprocable therein adapted to spread the adjacent ends of the shoes under the influence of fluid pressure, and a pair of arcuate T-section shoes having their webs lying in the center plane of the spider and guided between the six remaining pairs of circumferentially spaced spider arms, each of said shoes being guided by three said pairs of arms located near each end of the shoe and approximately at the center thereof, each of said shoes anchoring at one end or the other on one or the other of the two hydraulic cylinders depending upon the direction of drum rotation, and each of said shoes when anchored exerting an axially centered balanced force on one pair of torque-taking spider arms.

7. A drum brake comprising a supporting spider composed of two symmetrical plate-like stampings having central disc portions lying flat against one another and against an annular flange on a fixed member to which they are secured, each of said stampings having an annular flared strengthening flange and also having at least seven circumferentially spaced substantially radially extending arms offset axially from said central portion, the arms of the two stampings being arranged in pairs of axially spaced aligned arms, at least one of said pairs of arms serving as torque-taking arms, said torque-taking arms being provided with centrally located cylindrical apertures, an anchor member having cylindrical bosses extending laterally for support into the apertures of said pair of arms, nibs on said apertured arms of the spider projecting into complementary depressions in the exterior of the anchor member to prevent said anchor member from rotating about the axis of the laterally extending bosses, the longitudinal axis of the anchor member lying in the center plane of the spider, and a pair of arcuate T-section shoes having their webs lying in the center plane of the spider and guided between the six remaining pairs of circumferentially spaced spider arms, each of said shoes being guided by three said pairs of arms located near each end of the shoe and approximately at the center thereof, and each of said shoes when anchored exerting an axially centered balanced force on the pair of torque-taking spider arms.

8. A drum brake comprising a supporting spider composed of two symmetrical plate-like stampings having central disc portions lying flat against one another and against an annular flange on a fixed member to which they are secured, each of said stampings having at least four circumferentially spaced substantially radially extending arms offset axially from said central portion, the arms of the two stampings being arranged in pairs of axially spaced aligned arms, two of said pairs of arms serving as torque-taking arms, said torque-taking arms being located diametrically opposite one another and being provided with centrally located cylindrical apertures, a pair of hydraulic cylinders each having cylindrical bosses extending laterally for support into the apertures of one of said diametrically opposed pairs of arms, additional means for positively locating said cylinders to prevent them from rotating about the axes of the laterally extending bosses, the longitudinal axes of the cylinders lying in the center plane of the spider, each of said cylinders having a pair of pistons reciprocable therein adapted to spread the adjacent ends of the shoes under the influence of fluid pressure, and a pair of arcuate T-section shoes having their webs lying in the center plane of the spider and guided between the two or more remaining pairs of circumferentially spaced spider arms, each of said shoes anchoring at one end or the other on one or the other of the two hydraulic cylinders depending upon the direction of drum rotation, and each of said shoes when anchored exerting an axially centered balanced force on one pair of torque-taking spider arms.

9. A drum brake comprising a supporting spider composed of two symmetrical plate-like stampings having central disc portions lying flat against one another and against an annular flange on a fixed member to which they are secured, each of said stampings having an annular flared strengthening flange and also having at least four circumferentially spaced substantially radially extending arms offset axially from said central portion, the arms of the two stampings being arranged in pairs of axially spaced aligned arms, two of said pairs of arms serving as torque-taking arms, said torque-taking arms being located diametrically opposite one another and being provided with apertures, a pair of hydraulic cylinders each having bosses extending laterally for support into the apertures of one of said diametrically opposed pairs of arms, and longitudinal axes of the cylinders lying in the center plane of the spider, each of said cylinders having a pair of pistons reciprocable therein adapted to spread the adjacent ends of the shoes under the influence of fluid pressure, and a pair of arcuate T-section shoes having their webs lying in the center plane of the spider and guided between the two or more remaining pairs of circumferentially spaced spider arms, each of said shoes anchoring at one end or the other on one or the other of the two hydraulic cylinders depending upon the direction of drum rotation, and each of said shoes when anchored exerting an axially centered balanced force on one pair of torque-taking spider arms.

10. A drum brake comprising a supporting spider composed of two symmetrical plate-like stampings having central disc portions lying flat against one another and against an annular flange on a fixed member to which they are secured, each of said stampings having at least four circumferentially spaced substantially radially extending arms offset axially from said central portion, the arms of the two stampings being arranged in pairs of axially spaced aligned arms, two of said pairs of arms serving as torque-taking arms, said torque-taking arms being located diametrically opposite one another and being provided with apertures, a pair of hydraulic cylinders each having bosses extending laterally for support into the apertures of one of said diametrically opposed pairs of arms, the longitudinal axes of the cylinders lying in the center plane of the spider, each of said cylinders having a pair of pistons reciprocable therein adapted to spread the adjacent ends of the shoes under the influence of fluid pressure, and a pair of arcuate T-section shoes having their webs lying in the center plane of the spider and guided between the two or more remaining pairs of circumferentially spaced spider arms, each of said shoes anchoring at one end or the other on one or the other of the two hydraulic cylinders depending upon the direction of drum rotation, and each of said shoes when anchored exerting an axially centered balanced force on one pair of torque-taking spider arms.

11. A drum brake comprising a supporting spider composed of two symmetrical plate-like stampings having central disc portions lying flat against one another and against an annular flange on a fixed member to which they are secured, each of said stampings having at least three circumferentially spaced substantially radially extending arms offset axially from said central portion, the arms of the two stampings being arranged in pairs of axially spaced aligned arms at least one of said pairs of arms being provided with apertures, a hydraulic cylinder having bosses extending laterally for support into the apertures of said pair of arms, the longitudinal axis of the cylinder lying in the center plane of the spider, said cylinder having a pair of pistons reciprocable therein adapted to spread the adjacent ends of the shoes under the influence of fluid pressure, and a pair of arcuate T-section shoes having their webs lying in the center plane of the spider and guided between the two or more remaining pairs of circumferentially spaced spider arms.

12. A drum brake comprising a supporting spider composed of two symmetrical plate-like stampings having central disc portions lying flat against one another and against an annular flange on a fixed member to which they are secured, each of said stampings having at least three circumferentially spaced substantially radially extending arms offset axially from said central portion, the arms of the two stampings being arranged in pairs of axially spaced aligned arms, at least one of said pairs of arms being provided with apertures, an actuator having bosses extending laterally for support into the apertures of said pair of arms, the longitudinal axis of the actuator lying in the center plane of the spider, said actuator being adapted to spread the adjacent ends of the shoes and a pair of arcuate T-section shoes having their webs lying in the center plane of the spider and guided between the two or more remaining pairs of circumferentially spaced spider arms.

13. A drum brake comprising a supporting spider composed of two symmetrical plate-like stampings having central disc portions lying flat against one another and against an annular flange on a fixed member to which they are secured, each of said stampings having at least three circumferentially spaced substantially radially extending arms offset axially from said central portion, the arms of the two stampings being arranged in pairs of axially spaced aligned arms, at least one of said pairs of arms being provided with apertures, an anchor member having bosses extending laterally for support into the apertures of said pair of arms, the longitudinal axis of the anchor member lying in the center plane of the spider, said anchor member being adapted to receive the anchoring torque of one or both of the shoes, and a pair of arcuate T-section shoes having their webs lying in the center plane of the spider and guided between the two or more remaining pairs of circumferentially spaced spider arms.

14. A drum brake comprising a supporting spider composed of two symmetrical plate-like stampings having central mounting portions lying flat against one another and adapted to be secured to a fixed member, each of said stampings having at least four circumferentially spaced substantially radially extending arms offset axially from said central portion, the arms of the two stampings being arranged in pairs of axially spaced aligned arms, two of said pairs of arms serving as torque-taking arms, said torque-taking arms being located diametrically opposite one another, two hydraulic cylinders, each supported by one of said torque-taking pairs of arms, the longitudinal axes of the cylinders lying in the center plane of the spider, each of said cylinders having pistons reciprocable therein adapted to spread the adjacent ends of the shoes under the influence of fluid pressure, and two arcuate T-section shoes having their webs lying in the center plane of the spider and guided between the two or more remaining pairs of circumferentially spaced spider arms, each of said shoes anchoring an one end or the other on one or the other of the two hydraulic cylinders depending upon the direction of drum rotation, and each of said shoes when anchored exerting an axially centered balanced force on one pair of torque-taking spider arms.

15. A drum brake comprising a supporting spider composed of two symmetrical plate-like stampings having central mounting portions lying flat against one another and adapted to be secured to a fixed member, each of said stampings having at least four circumferentially spaced substantially radially extending arms offset axially from said central portion, the arms of the two stampings being arranged in pairs of axially spaced aligned arms, two of said pairs of arms serving as torque-taking arms, said torque-taking arms being located diametrically opposite one another, two hydraulic cylinders, each supported by one of said torque-taking pairs of arms, the longitudinal axes of the cylinders lying in the center plane of the spider, each of said cylinders having pistons reciprocable therein adapted to spread the adjacent ends of the shoes under the influence of fluid pressure, and two arcuate T-section shoes having their webs lying in the center plane of the spider and guided between the two or more remaining pairs of circumferentially spaced spider arms, each of said shoes anchoring at one end or the other depending upon the direction of drum rotation, and each of said shoes when anchored exerting an axially centered balanced force on one pair of torque-taking spider arms.

16. A drum brake comprising a supporting spider composed of two plate-like members having central mounting portions lying flat against one another and adapted to be secured to a fixed member, each of said plate-like members having at least four circumferentially spaced substantially radially extending arms offset axially from said central portion, the arms of the two plate-like members being arranged in pairs of axially spaced arms, two of said pairs of arms serving as torque-taking arms, said torque-taking pairs of arms being located opposite one another, two hydraulic cylinders, each supported by one of said torque-taking pairs of arms, the longitudinal axes of the cylinders lying in the center plane of the spider, each of said cylinders having pistons reciprocable therein adapted to spread the adjacent ends of the shoes under the influence of fluid pressure, and two arcuate T-section shoes having their webs lying in the center plane of the spider and guided between the two or more remaining pairs of circumferentially spaced spider arms, each of said shoes anchoring at one end or the other depending upon the direction of drum rotation, and each of said shoes when anchored exerting an axially centered balanced force on one pair of torque-taking spider arms.

17. A drum brake comprising a supporting spider composed of two symmetrical plate-like stampings having central mounting portions lying flat against one another and adapted to be secured to a fixed member, each of said stampings having at least three circumferentially spaced substantially radially extending arms offset axially from said central portion, the arms of the two stampings being arranged in pairs of axially spaced aligned arms, at least one of said pairs of arms serving as torque-taking arms, a hydraulic cylinder supported by said torque-taking pair of arms, the longitudinal axis of the cylinder lying in the center plane of the spider, said cylinder having pistons reciprocable therein adapted to spread the adjacent ends of the shoes under the influence of fluid pressure, and two arcuate T-section shoes having their webs lying in the center plane of the spider and guided between the two or more remaining pairs of circumferentially spaced spider arms.

18. A drum brake comprising a supporting spider composed of two symmetrical plate-like stampings having central mounting portions lying flat against one another and adapted to be secured to a fixed member, each of said stampings having at least three circumferentially spaced substantially radially extending arms offset axially from said central portion, the arms of the two stampings being arranged in pairs of axially spaced aligned arms, at least one of said pairs of arms serving as torque-taking arms, a hydraulic cylinder supported by said torque-taking pair of arms, the longitudinal axis of the cylinder lying in the center plane of the spider, said cylinder having pistons reciprocable therein adapted to spread the adjacent ends of the shoes under the influence of fluid pressure, and two arcuate T-section shoes having their webs lying in the center plane of the spider and guided between the two or more remaining pairs of circumferentially spaced spider arms, said shoes being pivotally connected and adapted to shift as a unit to anchor on said hydraulic cylinder through either one shoe or the other depending upon the direction of drum rotation.

19. A drum brake comprising a supporting spider composed of two plate-like members having central mounting portions lying flat against one another and adapted to be secured to a fixed member, each of said plate-like members having at least three circumferentially spaced substantially radially extending arms offset axially from said central portion, the arms of the two plate-like members being arranged in pairs of axially spaced arms, at least one of said pairs of arms serving as torque-taking arms, a hydraulic cylinder supported by said torque-taking pair of arms, the longitudinal axis of the cylinder lying in the center plane of the spider, said cylinder having pistons reciprocable therein adapted to spread the adjacent ends of the shoes under the influence of fluid pressure, and two arcuate T-section shoes having their webs lying in the center plane of the spider and guided between the two or more remaining pairs of circumferentially spaced spider arms, said shoes being pivotally connected and adapted to shift as a unit to anchor on said hydraulic cylinder through either one shoe or the other depending upon the direction of drum rotation.

20. A drum brake comprising a supporting spider composed of two symmetrical plate-like stampings having central mounting portions lying flat against one another and adapted to be secured to a fixed member, each of said stampings having at least three circumferentially spaced substantially radially extending arms offset axially from said central portion, the arms of the two stampings being arranged in pairs of axially spaced aligned arms, an actuator supported by one of said pairs of arms, the longitudinal axis of the actuator lying in the center plane of the spider, said actuator being adapted to spread the adjacent ends of the shoes, and two arcuate T-section shoes having their webs lying in the center plane of the spider and guided between the two or more remaining pairs of circumferentially spaced spider arms.

21. A drum brake comprising a supporting spider composed of two symmetrical plate-like stampings having central mounting portions lying flat against one another and adapted to be secured to a fixed member, each of said stampings having at least three circumferentially spaced substantially radially extending arms offset axially from said central portion, the arms of the two stampings being arranged in pairs of axially spaced aligned arms, an actuator supported by one of said pairs of arms, and adapted to spread the adjacent ends of the shoes, and two arcuate T-section shoes having their webs lying in the center plane of the spider and guided between the two or more remaining pairs of circumferentially spaced spider arms.

22. A drum brake comprising a supporting spider composed of two plate-like members having central mounting portions lying flat against one another and adapted to be secured to a fixed member, each of said plate-like members having at least three circumferentially spaced substantially radially extending arms offset axially from said central portion, the arms of the two plate-like members being arranged in pairs of axially spaced aligned arms, an actuator supported by one of said pairs of arms, and adapted to spread the adjacent ends of the shoes, and two arcuate T-section shoes having their webs lying in the center plane of the spider and guided between the two or more remaining pairs of circumferentially spaced spider arms.

23. A drum brake structure comprising a supporting spider composed of two symmetrical plate-like stampings having central disc portions lying flat against one another and against an annular flange on a fixed member to which they are secured, each of said stampings having an annular flared strengthening flange and also having eight circumferentially spaced substantially radially extending arms offset axially from said central portion, the arms of the two stampings being arranged in pairs of axially spaced aligned arms, at least one of said pairs of arms serving as torque-taking arms, an anchor member extending between and supported by said torque-taking pair of arms, and a pair of arcuate T-section shoes having their webs lying in the center plane of the spider and guided between six of the remaining pairs of circumferentially spaced spider arms, each of said shoes being guided by three said pairs of arms located near each end of the shoe and approximately at the center thereof, and each of said shoes when anchored exerting an axially centered balanced force on the pair of torque-taking spider arms.

24. A drum brake structure comprising a supporting spider composed of two symmetrical plate-like stampings having central disc portions lying flat against one another and against an annular flange on a fixed member to which they are secured, each of said stampings having an annular flared strengthening flange and also having at least three circumferentially spaced substantially radially extending arms offset axially from said central portion, the arms of the two stampings being arranged in pairs of axially spaced aligned arms, at least one of said pairs of arms serving as torque-taking arms, an anchor member extending between and supported by said torque-taking pair of arms, and a pair of arcuate T-section shoes having their webs lying in the center plane of the spider and guided between the two or more remaining pairs of circumferentially spaced spider arms, each of said shoes when anchored exerting an axially centered balanced force on the pair of torque-taking spider arms.

25. A drum brake structure comprising a supporting spider composed of two symmetrical plate-like stampings having central mounting portions lying flat against one another and adapted to be secured to a fixed member, each of said stampings having at least three circumferentially spaced substantially radially extending arms offset axially from said central portion, the arms of the two stampings being arranged in pairs of axially spaced aligned arms, at least one of said pairs of arms serving as torque-taking arms, an anchor member extending between and supported by said torque-taking pair of arms, and a pair of arcuate T-section shoes having their webs lying in the center plane of the spider and guided between the two or more remaining pairs of circumferentially spaced spider arms, each of said shoes when anchored exerting an axially centered balanced force on the pair of torque-taking spider arms.

26. In a drum brake structure, a supporting spider composed of two symmetrical plate-like stampings having central disc portions lying flat against one another and adapted to lie against an annular flange on a fixed member and to be secured thereto, each of said stampings having an annular flared strengthening flange and also having eight circumferentially spaced substantially radially extending arms offset axially from said central portion, the arms of the two stampings being arranged in pairs of axially spaced aligned arms, at least one of said pairs of arms serving as torque-taking arms, and at least six of the remaining pairs of circumferentially spaced spider arms being adapted to guide the brake shoes.

27. In a drum brake structure, a supporting spider composed of two symmetrical plate-like stampings having central disc portions lying flat against one another and adapted to lie against an annular flange on a fixed member and to be secured thereto, each of said stampings having an annular flared strengthening flange and also having at least three circumferentially spaced substantially radially extending arms offset axially from said central portion, the arms of the two stampings being arranged in pairs of axially spaced aligned arms, at least one of said pairs of arms serving as torque-taking arms, and the two or more remaining pairs of circumferentially spaced spide arms, being adapted to guide the brake shoes.

28. In a drum brake structure, a supporting spider composed of two plate-like stampings having central mounting portions lying flat against one another and adapted to be secured to a fixed member, each of said stampings having at least three circumferentially spaced substantially radially extending arms offset axially from said central portion, the arms of the two stampings being arranged in pairs of axially spaced arms, at least one of said pairs of arms serving as torque-taking arms, and the two or more remaining pairs of circumferentially spaced spider arms, being adapted to guide the brake shoes.

29. For use with a non-rotatable brake support member and an arcuate T-section friction element mounted on and adapted to transmit anchoring torque to said support member, means for normally retaining said friction element in released position comprising one or more radially extending tension springs each connected at its inner end to the support member and at its outer end to a projection formed on the under side of the shoe rim, by means of an arm extending through an opening in the shoe web, the force of the spring on the shoe being exerted by the spring arm acting on the inner edge of said web opening.

30. A drum brake structure comprising a supporting spider having a substantially flat central portion secured to a non-rotatable member and having at least one pair of radially extending axially spaced arms adapted to act as guiding means for a shoe, an arcuate T-section shoe having its web lying in the center plane of the supporting spider and guided by said pair of radial arms, and means for normally retaining said shoe in released position comprising one or more radially extending tension springs each connected at its inner end to the supporting spider and at its outer end to a projection formed on the under side of the shoe rim, by means of an arm extending through an opening in the shoe web, the force of the spring on the shoe being exerted by the spring arm acting on the inner edge of said web opening, the spring due to the spacing of its axis from the plane of the shoe web exerting a slight cocking force on the shoe to prevent rattling thereof.

31. A drum brake structure comprising a supporting spider having a substantially flat central portion secured to a non-rotatable member, an arcuate T-section shoe having its web lying in the center plane of the supporting spider, and means for normally retaining said shoe in released position comprising one or more readily extending tension springs each connected at its inner end to the supporting spider and at its outer end to a projection formed on the under side of the shoe rim, by means of an arm extending through an opening in the shoe web, the force of the spring on the shoe being exerted by the spring arm acting on the inner edge of said web opening.

32. A drum brake comprising a supporting spider composed of two stampings having central disc portions lying flat against one another and adapted to be secured to a fixed member, each of said stampings having three circumferentially spaced substantially radially extending arms offset axially from said central portion, the arms of the two stampings being arranged in pairs, at least one of said pairs of arms being provided with apertures, an anchor member having bosses extending laterally for support into the apertures of said pair of arms, said anchor member being adapted to receive the anchoring torque of one or both of the shoes, and a pair of arcuate T-section shoes having their webs lying in the center plane of the spider and guided between the two remaining pairs of spider arms.

RUDOLPH A. GOEPFRICH.
BRYAN E. HOUSE.

REFERENCES CITED

The following references are of record in the file of this patent:

UNITED STATES PATENTS

| Number | Name | Date |
|---|---|---|
| 1,989,181 | Andres | Jan. 29, 1935 |
| 2,171,289 | Eakin | Aug. 29, 1939 |
| 2,214,911 | Shinn | Sept. 17, 1940 |
| 2,245,682 | Kerr | June 17, 1941 |
| 2,308,961 | Tatter | Jan. 19, 1943 |
| 2,322,121 | Frank | June 15, 1943 |
| 2,350,038 | Holbrith | May 30, 1944 |

Certificate of Correction

Patent No. 2,475,491                                                 July 5, 1949

RUDOLPH A. GOEPFRICH ET AL.

It is hereby certified that errors appear in the printed specification of the above numbered patent requiring correction as follows:

Column 5, lines 49 and 50, for "unnecessarily" read *unnecessary*; column 16, line 73, for the word "an" after "anchoring" read *at*; column 20, line 50, for "spide" read *spider*; column 21, line 31, for "readily" read *radially*;

and that the said Letters Patent should be read with these corrections therein that the same may conform to the record of the case in the Patent Office.

Signed and sealed this 21st day of February, A. D. 1950.

[SEAL]

THOMAS F. MURPHY,
*Assistant Commissioner of Patents.*